US008988814B1

(12) United States Patent
Harada et al.

(10) Patent No.: US 8,988,814 B1
(45) Date of Patent: Mar. 24, 2015

(54) STORAGE DEVICE, CONTROLLER, AND RECORDING AND REPRODUCING METHOD

(71) Applicant: Kabushiki Kaisha Toshiba, Minato-ku (JP)

(72) Inventors: Kohsuke Harada, Yokohama (JP);
Akihiro Yamazaki, Yokohama (JP);
Nobuhiro Maeto, Yokohama (JP);
Kazuto Kashiwagi, Yokohama (JP);
Tomokazu Okubo, Kawasaki (JP);
Naoki Tagami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/475,988

(22) Filed: Sep. 3, 2014

Related U.S. Application Data

(60) Provisional application No. 61/932,569, filed on Jan. 28, 2014.

(51) Int. Cl.
*G11B 5/035* (2006.01)
*G11B 5/09* (2006.01)

(52) U.S. Cl.
USPC ......................................... 360/65; 369/59.22

(58) Field of Classification Search
CPC .... G11B 20/10009; G11B 5/035; G11B 5/09;
G11B 27/3027; G11B 2220/20; G11B 5/59655; G11B 20/10055; G11B 7/005;
H03M 13/41; H03M 13/4107; H03M 13/6502;
H04L 1/0054; H04L 13/41; H04L 13/4107
USPC ........... 360/65, 29, 40, 41, 39, 49; 369/59.22;
714/795, 796; 375/341
See application file for complete search history.

(56) References Cited

U.S. PATENT DOCUMENTS

| | | | |
|---|---|---|---|
| 4,938,915 A | 7/1990 | Saito | |
| 6,370,097 B1 | 4/2002 | Hayashi et al. | |
| 6,778,483 B2 | 8/2004 | Mouri et al. | |
| 7,031,090 B2 * | 4/2006 | Ichihara et al. | 360/65 |

* cited by examiner

*Primary Examiner* — Nabil Hindi
(74) *Attorney, Agent, or Firm* — Oblon, McClelland, Maier & Neustadt, L.L.P.

(57) ABSTRACT

According to one embodiment, a storage device includes a data conversion unit that coverts user data of n bits, into m three-ary symbols, a recording medium that records the symbols as a signal of any one of three levels corresponding to values of the symbols, and a Viterbi equalizer that performs equalization of the m symbols simultaneously based on a signal read from the recording medium while setting the number of states as a power of 3 and using a trellis diagram having $2^n$ branches, and calculates $2^n$ likelihoods.

14 Claims, 5 Drawing Sheets

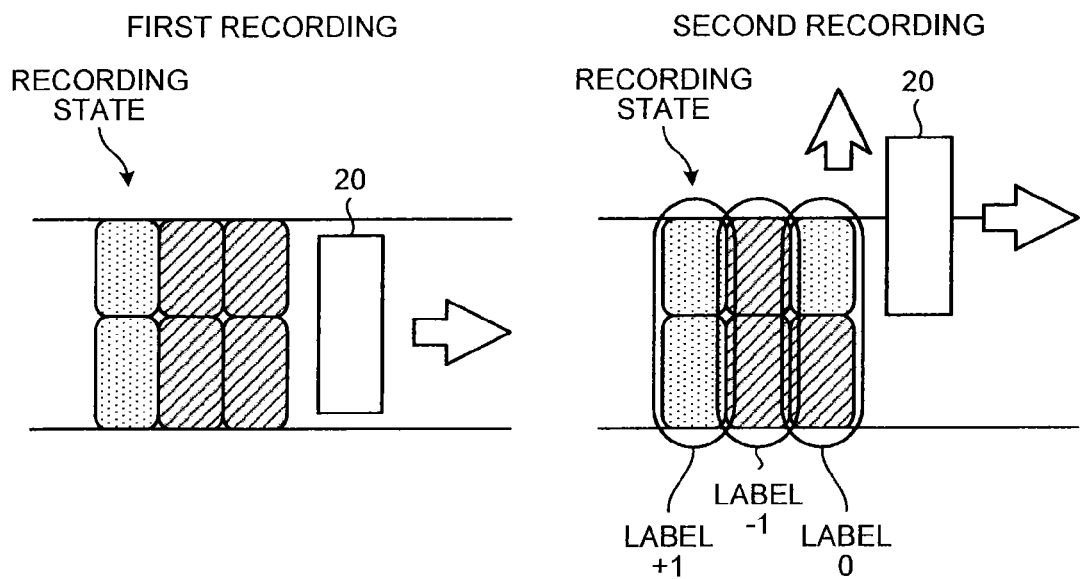

STORAGE DEVICE, CONTROLLER, AND RECORDING AND REPRODUCING METHOD

CROSS-REFERENCE TO RELATED APPLICATIONS

This application is based upon and claims the benefit of priority from U.S. Provisional Application No. 61/932,569, filed on Jan. 28, 2014; the entire contents of which are incorporated herein by reference.

FIELD

Embodiments described herein relate generally to a storage device, a controller, and a recording and reproducing method.

BACKGROUND

In a conventional magnetic recording system, information bits are expressed by signal levels such as "+1" and "−1" on a recording medium. In the magnetic recording system, when the recording density on a medium is increased, intersymbol interference occurs. Therefore, a reproduced signal cannot be output at the time of reproducing information, and recorded information cannot be reproduced correctly.

BRIEF DESCRIPTION OF THE DRAWINGS

FIG. 4 illustrates a recording system that records data using one recording head where the recording is performed in two separate operations;

FIG. 5 illustrates an example of a conversion table;

DETAILED DESCRIPTION

In general, according to one embodiment, a storage device includes a data conversion unit that converts user data of n bits (n is an integer equal to or larger than 3) into m three-ary symbols (m is an integer equal to or larger than 2), a recording medium that can record three level signals and records the symbols as a signal of any one of three levels corresponding to values of the symbols, and a Viterbi equalizer that performs equalization of the m symbols simultaneously based on a signal read from the recording medium while setting the number of states as a power of 3 and using a trellis diagram having $2^n$ branches respectively corresponding to n bit data values from the respective states, and calculates $2^n$ likelihoods respectively corresponding to n bit data values.

Exemplary embodiments of a storage device, a controller, and a recording and reproducing method will be explained below in detail with reference to the accompanying drawings. The present invention is not limited to the following embodiments.

First Embodiment

Figure 1:
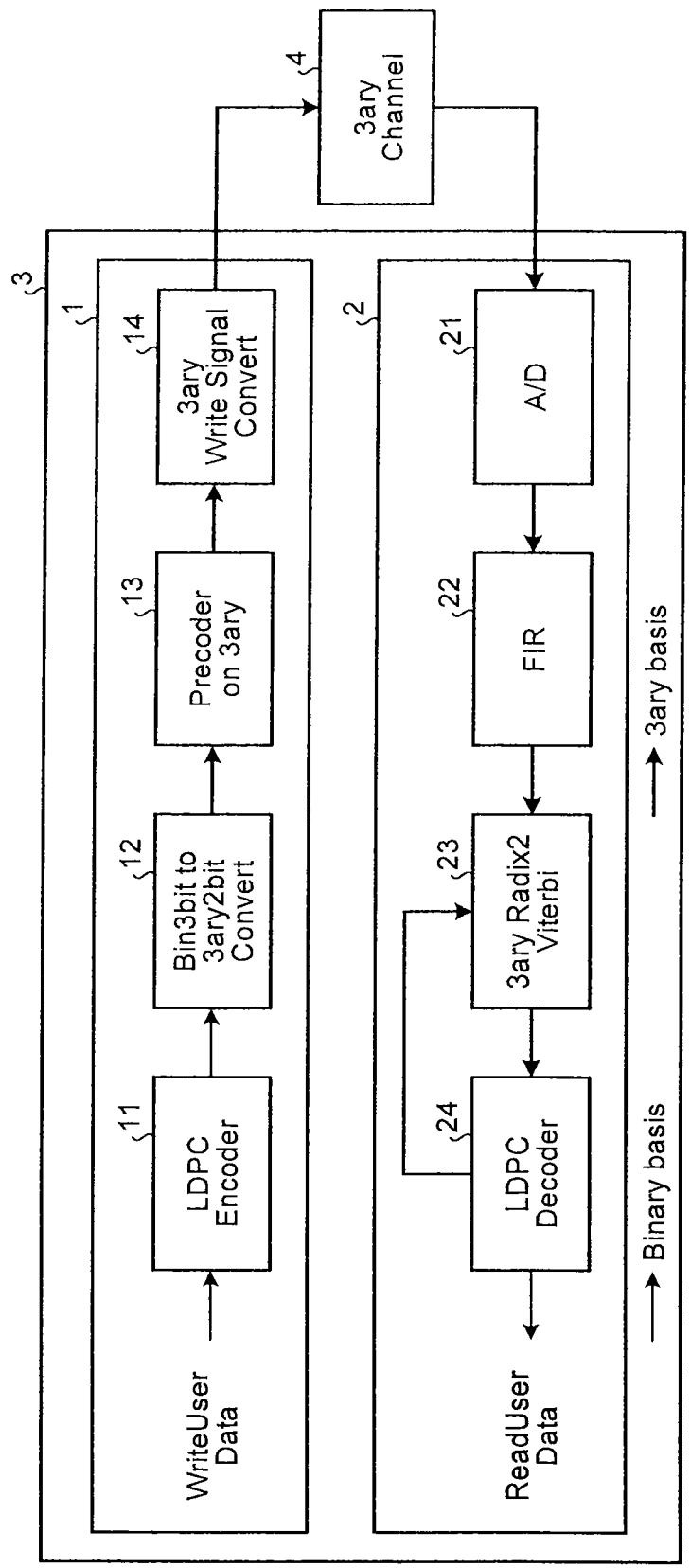
FIG. 1 is a block diagram illustrating a configuration example of a controller according to a first embodiment.

FIG. 1 is a block diagram illustrating a configuration example of a controller 3 according to a first embodiment. In a storage device, the controller 3 according to the present embodiment controls a recording medium such as a magnetic recording medium, a semiconductor memory, and an optical disk. In the following explanations, the present embodiment describes an example of using a magnetic recording medium as a recording medium. However, it is only necessary that the recording medium can record three signal levels thereon, and the recording medium controlled by the controller 3 according to the present embodiment is not limited to a magnetic recording medium.

The controller 3 is constituted by a data generation unit 1 and a data restoration unit 2. The data generation unit 1 generates output data that is output to an external medium (3ary Channel) 4 based on user data (information bits). The data restoration unit 2 restores the user data based on data input from the medium 4.

Figure 2:
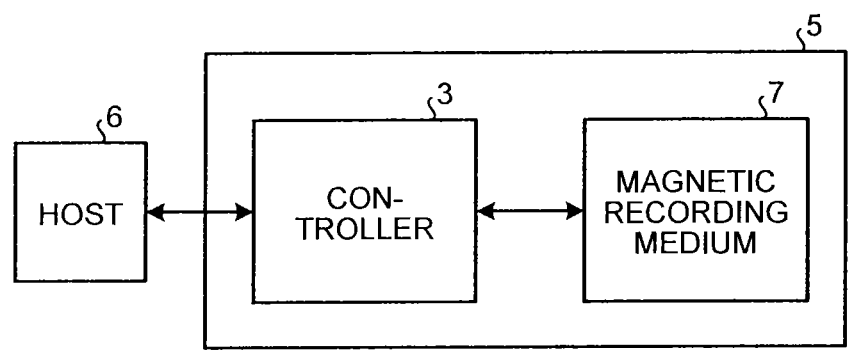
FIG. 2 illustrates a configuration example of a storage device according to the first embodiment.

FIG. 2 illustrates a configuration example of a storage device 5 according to the present embodiment. In the storage device 5, the controller 3 according to the present embodiment controls a magnetic recording medium 7. In the example of FIG. 2, the magnetic recording medium 7 corresponds to the medium 4 in FIG. 1. The storage device 5 is connectable to a host 6, and FIG. 2 illustrates a state where the storage device 5 is connected to the host 6. The host 6 is, for example, an electronic device such as a personal computer or a mobile terminal. While FIG. 2 illustrates an example in which the storage device 5 records therein user data received from the host 6, the storage device 5 can be also used as a storage device that records therein images, sound, and the like in an apparatus that records therein images, sound, and the like. Further, the controller 3 is a device that generates data output to the medium 4 and reproduces data input from the medium 4, and the medium 4 can be a medium other than a recording medium.

Generally, in a magnetic recording medium, two signal levels are expressed according to the state of two magnetization, and information bits are recorded by using the two signal levels. In this system, when the recording density is increased to store many information bits, intersymbol interference occurs and recorded information bits cannot be reproduced correctly. In the present embodiment, the amount of information in each symbol is increased by configuring the magnetic recording medium 7 such that three signal levels, which are +1 (a magnetization state having a first magnetization direction), −1 (a magnetization state having a second magnetization direction), and 0, can be recorded therein, and that information bits are expressed by a unit of plural symbols. With this configuration, even when the recordable amount of information in a magnetic recording medium is increased, it is possible to suppress intersymbol interference and to prevent degradation of reproduction accuracy of recorded information.

Figure 3:
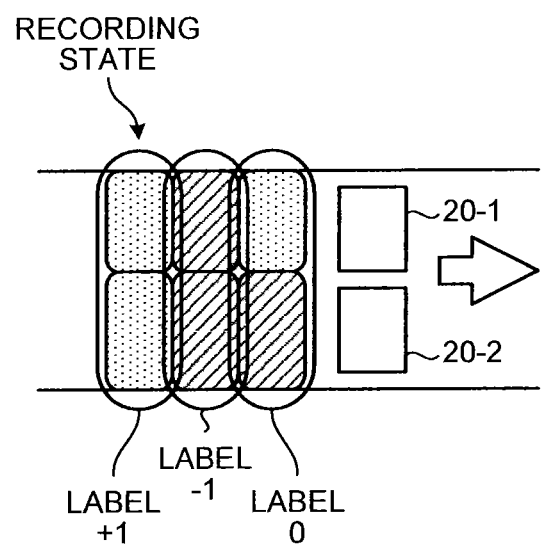
FIG. 3 illustrates a recording system using two recording heads simultaneously.

While there are no restrictions on the method of realizing the magnetic recording medium 7 that can record therein three signal levels, which are +1, −1, and 0, recording methods shown in FIGS. 3 and 4 can be used, for example. FIG. 3 illustrates a recording system using two recording heads simultaneously. As shown in FIG. 3, the magnetic recording medium 7 includes two recording heads 20-1 and 20-2, and as the recording heads 20-1 and 20-2 simultaneously record the magnetization state of any of two values of A and B, a three-leveled signal is realized. The diagonally hatched portion in FIG. 3 indicates a magnetization state A, and the dot-hatched portion in FIG. 3 indicates a magnetization state B. Each of the three-leveled signal is respectively denoted by a label +1, a label 0, and a label −1. When the label is −1, both the recording heads 20-1 and 20-2 record the magnetization state A, and when the label is +1, both the recording heads 20-1 and 20-2 record the magnetization state B. Further, when the label is 0, any one of the recording heads 20-1 and 20-2 records the magnetization state A and the other one records the magnetization state B. In this manner, the magnetic recording medium 7 can express three-valued labels of +1, 0, and −1. At the time of reading, two tracks recorded by the recording heads 20-1 and 20-2 are read simultaneously by one reproducing head.

FIG. 4 illustrates a recording system that records data using one recording head where the recording is performed in two separate operations. In the example of FIG. 4, the magnetic recording medium 7 includes one recording head 20, and after once recording the magnetization state of any one of two values A and B, the position of the recording head 20 is shifted to a direction that is vertical to the advancing direction of a track. At this time, the amount of shifting the recording head 20 is made half the width recorded at the first recording. With this operation, as shown on the right side of FIG. 4, at the second recording, recording in an area that is half the width recorded at the first recording is performed. With this operation, among the recording areas recorded in FIG. 4, the bottom half thereof is in a magnetization state recorded at the first recording, and the top half thereof is in a magnetization state recorded at the second recording. In this manner, similarly to the case of FIG. 3, the magnetic recording medium 7 can express three-leveled of +1, 0, and −1. At the time of reading, two tracks recorded by the two recording operations are read simultaneously by one read head element.

The method of realizing the magnetic recording medium 7 capable of recording therein three signal levels, which are +1, −1, and 0, is not limited to the two examples mentioned above. For example, it is also possible to employ a method in which the label values +1 and −1 are expressed by two normal magnetization states (N and S), and the label value 0 is expressed by changing the two magnetization states with a high frequency. By changing the two magnetization states with a high frequency, it is possible to realize a magnetization state that is intermediate between the two magnetization states N and S.

Next, a recording method and a reproducing method of information bits according to the present embodiment are explained. In the present embodiment, as described above, information is recorded in the magnetic recording medium 7 by using a symbol capable of expressing three values (a three-leveled symbol). One symbol indicates information recorded in two recorded parts (symbol recorded areas) that are encircled as the label 0, the label −1, and the label +1 in FIGS. 3 and 4.

In the present embodiment, three bits of user data (information bits) which is indicated by two values of 0 and 1 can be expressed by two symbols. In this manner, the amount of information in each symbol becomes 1.5 bits and, as compared to a case where one bit of user data is expressed by one symbol, the substantive recording density can be made 1.5 times larger.

While it has been explained that three bits of user data are expressed by two recording symbols that are three-labeled; the present embodiment is not limited thereto. It is also possible to employ a method in which user data of n bits (n is an integer equal to or larger than 3) is expressed by m (m<n) recording symbols that are k-valued labeled (k is an integer equal to or larger than 3), such as expressing six bits of user data by four recording symbols.

As shown in FIG. 1, the data generation unit 1 of the controller 3 includes an LDPC (Low Density Parity Check) encoder 11, a data conversion unit (Bin3 bit to 3ary2 bit Convert) 12 which means 'binary 3 bits to 3ary 2symbols', a precoder (Precoder on 3ary) 13, and a write control unit (3ary Write Signal Convert) (output unit) 14.

The LDPC encoder 11 generates a code word by performing LDPC encoding on user data over $GF(2^3)$ (GF(8)). In this example, while $GF(2^3)$ is used as the Galois extension field, the Galois extension field used in the LDPC encoding is not limited thereto. Further, while the LDPC encoding is used as an example of an error correction code to the user data, the error correction code is not limited thereto, and other codes such as a convolution code or an RS (Reed Solomon) code can be used.

At the time of performing LDPC encoding, when GF(8) is used for encoding in order to record user data of three bits by using two recording symbols, the three bits of the user data can be handled as one element over the GF(8). At the time of recording user data of n bits by using m recording symbols, when $GF(2^n)$ is used for encoding, the n bits of the user data can be handled as one element over the $GF(2^n)$.

The data conversion unit 12 converts user data of three bits into two recording symbols (two three-valued labels), and inputs the converted two recording symbols in the precoder 13. For example, the data conversion unit 12 holds a conversion table set in advance, and converts user data of three bits into two recording symbols by using the conversion table. FIG. 5 illustrates an example of a conversion table. The left side of the table in FIG. 5 indicates values of three bits of user data, and the right side thereof indicates values of two three-leveled symbols (two recording symbols). For example, when the three bits of the user data are "000", the three bits are converted into "+1 +1". The conversion table in FIG. 5 is only an example, and the correspondence between the three bits of the user data and specific values of the two recording symbols is not limited to the example of FIG. 5. It is only necessary that the value of the two recording symbols corresponds to a $2^3$-state of the three bits of the user data in a one-to-one relationship.

There are $3^2$ combinations of the two recording symbols, that is, there are nine combinations. In the conversion table, it suffices to use eight combinations among the nine combinations, and one pair among the values of the two recording symbols is not used. An error rate is changed depending on which values are chosen as the values of the two recording symbols not used for the conversion. When the magnetic recording medium 7 uses a vertical recording system and uses two recording symbols that are three-labeled as described above, the error rate is degraded when the values of the two recording symbols are "0 0". Therefore, it is possible to lower an error occurrence rate if the conversion table is created while excluding "0 0", in which case the error rate is improved. FIG. 5 illustrates an example of a conversion table that is created while excluding "0 0". As for which values have a good error rate depends on factors such as what recording system is used and the like; however, once conditions such as the recording system and the like are determined, the values having a good error rate can be obtained in advance.

The precoder 13 is a precoder corresponding to three-ary labeling, and performs a precoding process on input recording symbols that are three-ary labeled. The write control unit 14 generates a write signal for recording (writing) recording symbols in the magnetic recording medium 7 based on recording symbols to be output from the precoder 13 and inputs the write signal in the magnetic recording medium 7. In the magnetic recording medium 7, as described above, three-ary labeled recording is performed.

Next, a reading method, that is, a reproducing method, of data from the magnetic recording medium 7 is explained. As shown in FIG. 1, the data restoration unit 2 of the controller 3 includes an AD (Analog to Digital) convertor (A/D) 21, an FIR (Finite Impulse Response) filter (FIR) 22, a Viterbi equalizer 23, and an LDPC decoder 24.

The AD convertor 21 converts an analog signal read from the magnetic recording medium 7 into a digital signal and inputs the digital signal in the FIR filter 22. The FIR filter 22 performs an FIR equalizing process on the digital signal and inputs the digital signal in the Viterbi equalizer 23. The Viterbi equalizer 23 performs a Viterbi equalizing process on the input digital signal, calculates a likelihood, and inputs the likelihood in the LDPC decoder 24. The LDPC decoder 24 performs an LDPC decoding process using the likelihood.

Figure 6:
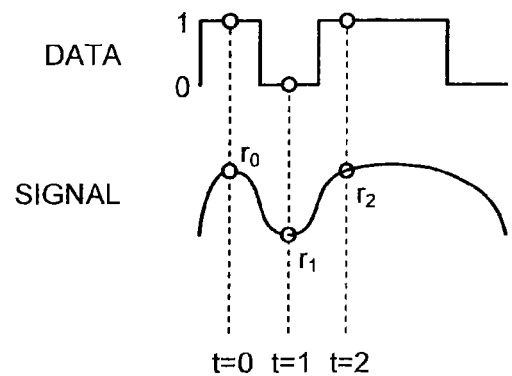
FIG. 6 is a schematic diagram illustrating recorded information and a waveform of a signal read from a magnetic recording medium.
Figure 7:
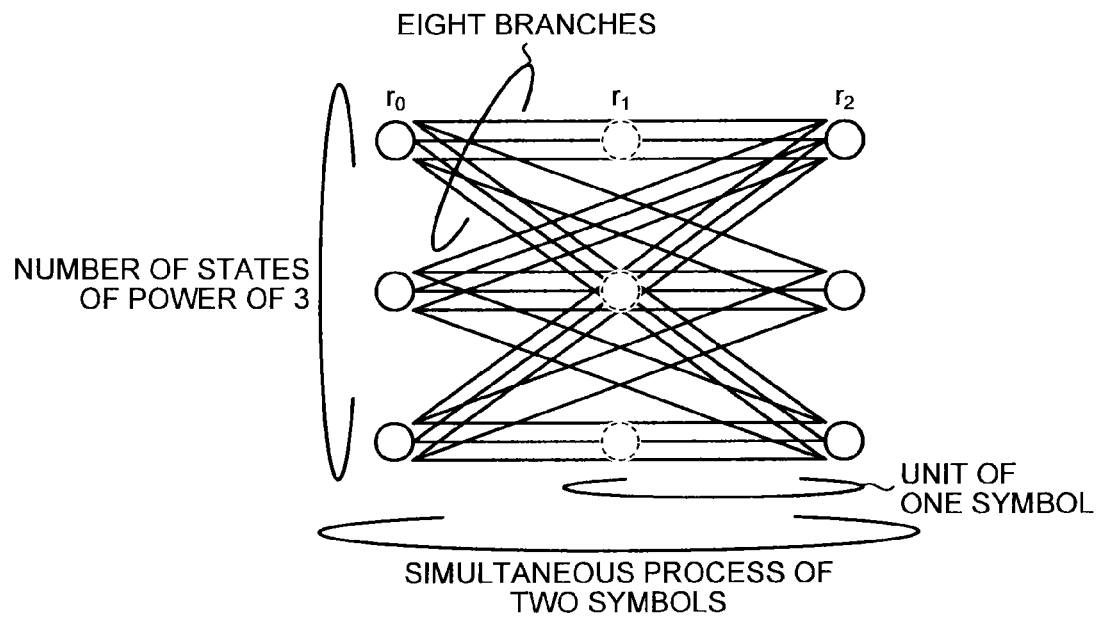
FIG. 7 illustrates an example of a trellis diagram according to the first embodiment.

In the present embodiment, the Viterbi equalizer 23 performs the following processes as two symbols are processed simultaneously. FIG. 6 is a schematic diagram illustrating recorded information and a waveform of a signal read from the magnetic recording medium 7. FIG. 7 illustrates an example of a trellis diagram according to the present embodiment. In FIG. 6, t=0, t=1, and t=2 are sample times, and $r_0$, $r_1$, and $r_2$ are respectively signals of the times t=0, t=1, and t=2. As described above, in the present embodiment, user data of three bits is expressed by two symbols. The two symbols expressing the user data of three bits are assumed as a pair of symbols. $r_1$ and $r_2$ in FIG. 6 are a pair of symbols. The Viterbi equalizer 23 is assumed to be certain as to whether an input symbol is the top symbol of a pair of symbols. At the time of reproduction, because the magnetic recording medium 7 starts to read symbols from the top one of a pair of symbols, is suffices that the symbol to be read first is the top one of a pair of symbols. The present embodiment is not limited to this method, and, for example, the ascertaining method of the top one of a pair of symbols can be other methods, such as a method in which a control unit that controls the entirety of the controller 3 manages the top one of a pair of symbols and the control unit notifies the Viterbi equalizer 23 of the top one of the first pair of symbols of a signal to be input.

In the Viterbi equalization, as for a state of a certain time, likelihoods of a plurality of paths (state paths) up to reaching the state are obtained, and then a surviving path is obtained as the likelihood obtaining process is forwarded. In the present embodiment, the number of states defined by a target is expressed as a power of 3, and the number of branches output from the respective states is eight. The eight branches respectively correspond to the eight data values shown in the table in FIG. 5. Normally, as for three-leveled symbols, the number of branches upon consideration of a case of two previous times is $3^2=9$; however, in the present embodiment, the number of branches upon consideration of the Viterbi equalization is eight, which corresponds to the eight types of bit values in the table in FIG. 5. Therefore, as shown in FIG. 7, in the trellis diagram, eight branches are connected from respective states of t=0. Subsequently, the likelihood of each of the branches is calculated, and the calculated eight likelihoods are input in the LDPC decoder 24 as likelihoods corresponding to the three bit values shown on the left side of the table in FIG. 5. Likelihoods output from the Viterbi equalizer 23 are handled as the likelihoods of respective symbol labels of eight-labeled symbols (Non-Binary symbols) expressed by three bits, such as the likelihood of "000", the likelihood of "001", and so on. The LDPC decoder 24 performs an LDPC decoding process over GF(8) using the calculated eight likelihood.

Figure 8:
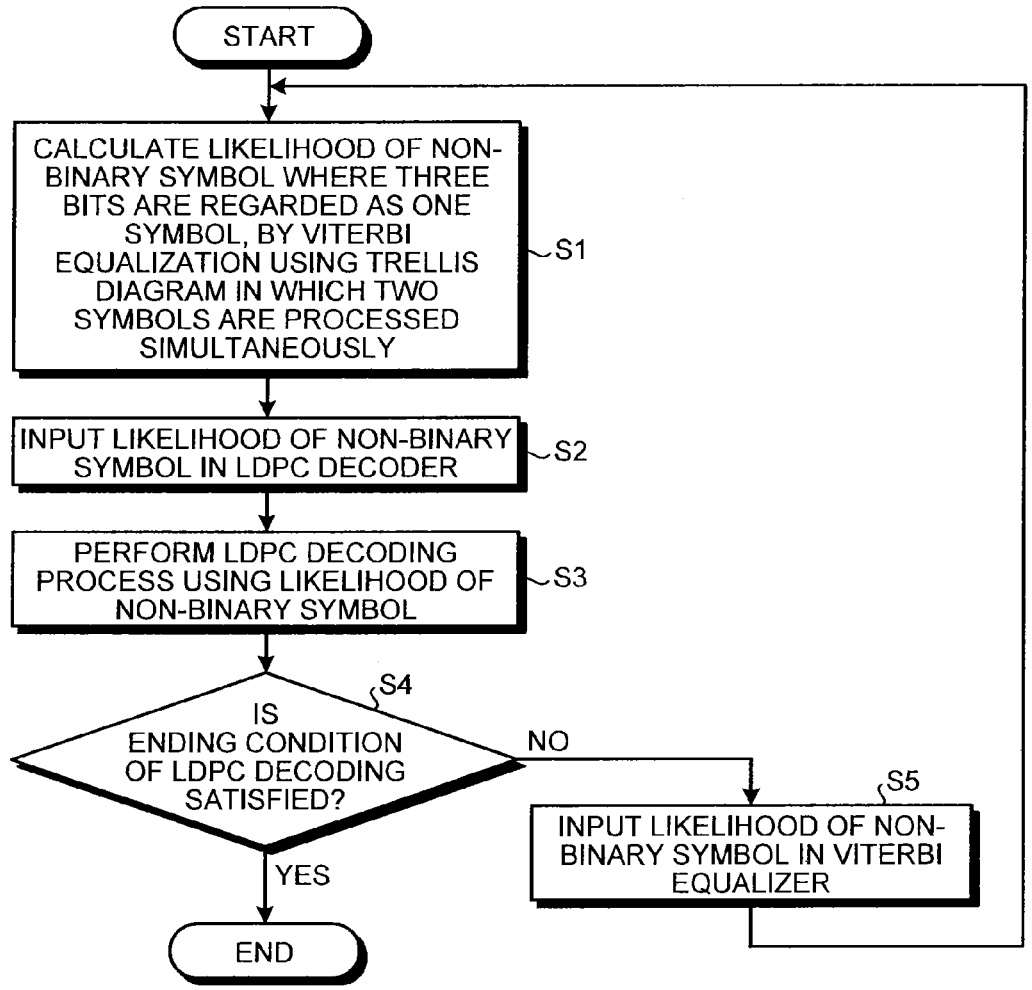
FIG. 8 is a flowchart illustrating an example of a decoding procedure performed by a Viterbi equalizer and an LDPC decoder according to the first embodiment.

FIG. 8 is a flowchart illustrating an example of a decoding procedure performed by the Viterbi equalizer 23 and the LDPC decoder 24 according to the present embodiment. As described above, the Viterbi equalizer 23 performs a Viterbi equalizing process on a signal input from the FIR filter by using a trellis diagram in which two symbols are processed simultaneously, and calculates likelihoods of respective symbols labels of eight-labeled symbols expressed by three bits (Step S1). The Viterbi equalizer 23 inputs the calculated likelihoods to the LDPC decoder 24 (Step S2).

The LDPC decoder 24 handles three bits as one element over GF(8) and performs decoding by using the likelihoods to be input from the Viterbi equalizer 23 (Step S3). The LDPC decoder 24 determines whether a stopping condition is satisfied (Step S4), and when the stopping condition is satisfied (Yes at Step S4), the decoding process is finished. Specifically, the stopping condition is a case where a parity check is performed on a temporarily estimated word and the parity check result satisfies a certain condition, or a case where the iteration count of the parity check reaches an upper limit set in advance. As the parity check result satisfies a certain condition and the process is ended, a decoding result (user data of three bits) is output as read-out user data. When the parity check result does not satisfy the certain condition, and then the iteration count reaches the upper limit and the decoding is stopped, a notification of a decoding failure is made.

When the ending condition is not satisfied (No at Step S4), the LDPC decoder 24 inputs a likelihood calculated in the course of the process in the Viterbi equalizer 23 (Step S5), the operation returns to Step S1, and the process of the Viterbi equalizer 23 is performed. The processes of the Viterbi equalizer 23 and the LDPC decoder 24 are iteratively performed.

In the present embodiment, in the Viterbi equalizer 23, Viterbi equalization is performed by using eight branches that correspond to eight values of user data of three bits, and a likelihood corresponding to the user data of three bits is input in the LDPC decoder 24. With this configuration, it is not necessary to perform a process of converting two symbols into the user data of three bits (a reverse conversion process to data conversion performed by the data conversion unit 12), and a reproducing process can be proceeded efficiently.

As an error correction code, when a code without using any likelihood at the time of decoding (such as an RS code) is used, the Viterbi equalizer 23 can input a hard decision result in a following decoder, or can input a soft decision result (a likelihood) in a decoder. For example, when an RS code is used, an RS decoder is provided instead of the LDPC decoder 24. Subsequently, as the Viterbi equalizer 23 performs repetitive operations within the Viterbi equalizer 23 in order to obtain determination results of bit values of three bits instead of likelihoods of respective user data of three bits, the determination results can be input in the RS decoder. With this configuration, the RS decoder can perform a general RS decoding process. Alternatively, it is possible to configure that the Viterbi equalizer 23 inputs likelihoods of respective user data of three bits in the RS decoder and the RS decoder performs a soft-decision RS decoding by using the likelihoods.

Further, when the error correction coding is not performed, it is also possible to apply the data recording and reproducing method according to the present embodiment. When the error correction coding is not performed, the LDPC encoder 11 and the LDPC decoder 24 are not necessary. In this case, the data conversion unit 12 converts user data of three bits not having the error correction coding performed thereon into two symbols. Subsequently, similarly to the case of performing the error correction coding, the two symbols are recorded in the magnetic recording medium 7. At the time of reproduction, similarly to the case of performing the error correction coding, the Viterbi equalizer 23 performs Viterbi equalization on an input signal by using eight branches that correspond to eight values of the user data of three bits, and by repeating Viterbi equalization for obtaining a surviving path, the Viterbi equalizer 23 outputs most probable user data of three bits as a determination result.

As described above, in the present embodiment, user data of three bits is converted into two three-leveled symbols and these symbols are recorded in the magnetic recording medium 7 that can realize three types of signal levels. Further, at the time of reproduction, a Viterbi equalizing process is performed simultaneously on two symbols that have been read from the magnetic recording medium 7, likelihoods of respective data values of three bits are calculated, and LDPC decoding is performed by using the likelihoods. With this configuration, the recordable amount of information in a magnetic recording medium can be increased while preventing degradation of reproduction accuracy of recorded information.

Second Embodiment

Figure 9:
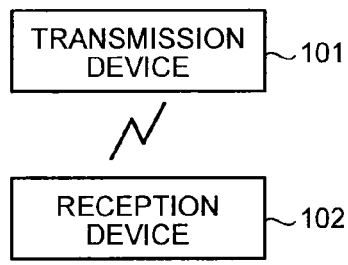
FIG. 9 illustrates a configuration example of a communication system according to a second embodiment.

FIG. 9 is a configuration example of a communication system according to a second embodiment. The present embodiment explains a case where the data generation unit 1 and the data restoration unit 2 described in the first embodiment are applied to communication. A transmission device 101 includes the data generation unit 1 described in the first embodiment. A reception device 102 includes the data restoration unit 2 described in the first embodiment. While a communication system that performs wireless communication is described in FIG. 9, the communication system can be a system that performs wired communication.

Similarly to the first embodiment, in the transmission device 101, the data generation unit 1 converts user data of three bits into two symbols. The transmission device 101 transmits the two symbols via transfer paths of three channels. In the example of FIG. 9, a communication path corresponds to the medium 4 shown in FIG. 1. The three channels can be three channels having mutually different frequencies, or can be three channels generated by time-sharing a certain period of time into three parts. One three-ary labeled symbol is expressed by transmitting data via any one of the three channels.

In the reception device 102, similarly to the first embodiment, the data restoration unit 2 reproduces a signal received from the transmission device 101. That is, Viterbi equalization is performed on two symbols simultaneously, and LDPC decoding is performed by using likelihoods of respective symbol labels of eight-labeled symbols expressed by three bits.

In the present embodiment, the transmission device 101 and the reception device 102 have been explained as separate devices in order to explain operations of transmission and reception; however, generally, a communication device has both functions of the transmission device 101 and functions of the reception device 102. Therefore, the communication system shown in FIG. 9 can be configured by two communication devices having identical configurations. These communication devices function as the transmission device 101 or the reception device 102 according to the direction of communication.

As described above, the present embodiment has explained an example where the data generation unit 1 and the data restoration unit 2 according to the first embodiment are used in a communication device. The data generation unit 1 and the data restoration unit 2 according to the first embodiment can be also applied to a communication system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a data conversion unit configured to covert user data of n bits into m three-ary symbols, where n is an integer equal to or larger than 3 and m is an integer equal to or larger than 2;
   a recording medium configured to be able to record three level signals and record the symbols as a signal of any one of three levels corresponding to values of the symbols; and
   a Viterbi equalizer configured to perform equalization of the m symbols simultaneously based on a signal read from the recording medium while setting the number of states as a power of 3 and using a trellis diagram having $2^n$ branches respectively corresponding to n bit data values from the respective states, and calculates $2^n$ likelihoods respectively corresponding to n bit data values.

2. The storage device according to claim 1, further comprising:
   an encoder configured to encode the user data; and
   a decoder configured to perform decoding with respect to a signal read from the recording medium, wherein
   the data conversion unit converts the encoded user data into m three-ary symbols,
   the Viterbi equalizer inputs the likelihoods in the decoder, and
   the decoder performs the decoding by using the likelihoods.

3. The storage device according to claim 2, wherein the encoder performs LDPC encoding.

4. The storage device according to claim 3, wherein
   the decoder inputs likelihoods calculated in the decoding in the Viterbi equalizer, and
   a process performed by the Viterbi equalizer and a process performed by the decoder are repeated.

5. The storage device according to claim 4, wherein the LDPC encoding is non-binary LDPC encoding in which n bits are expressed by $GF(2^n)$.

6. The storage device according to claim 1, wherein n=3 and m=2.

7. The storage device according to claim 1, wherein the data conversion unit converts the user data of n bits into a symbol value having excluded a specific symbol value among symbol values of the m symbols.

8. The storage device according to claim 1, wherein
   the recording medium is a magnetic recording medium, and
   the recording medium records the three level signals according to a first magnetization state having a first magnetization direction, a second magnetization state having a second magnetization direction that is different from the first magnetization direction, and a third magnetization state that is an intermediate state between the first magnetization state and the second magnetization state.

9. The storage device according to claim 8, wherein
the recording medium includes a first recording head, a second recording head, and one reproducing head,
the recording medium magnetizes a half of one symbol recording area in the first magnetization direction or the second magnetization direction by the first recording head and magnetizes a remaining half of the symbol recording area in the first magnetization direction or the second magnetization direction by the second recording head, and
the entirety of the symbol recording area is read by the reproducing head.

10. The storage device according to claim 8, wherein
the recording medium includes a recording head and a reproducing head,
the recording medium magnetizes a half of one symbol recording area in the first magnetization direction or the second magnetization direction by the recording head, and thereafter magnetizes a remaining half of the symbol recording area in the first magnetization direction or the second magnetization direction by the recording head, and
the entirety of the symbol recording area is read by the reproducing head.

11. A controller comprising:
a data conversion unit configured to covert user data of n bits into m three-ary symbols, where n is an integer equal to or larger than 3 and m is an integer equal to or larger than 2;
an output unit configured to output the symbols as three level signals corresponding to values of the symbols to a medium; and
a Viterbi equalizer configured to perform equalization of the m symbols simultaneously based on a signal read from the recording medium while setting the number of states as a power of 3 and using a trellis diagram having $2^n$ branches respectively corresponding to n bit data values from the respective states, and calculates $2^n$ likelihoods corresponding to n bit data values.

12. A controller according to claim 11, wherein the medium is a recording medium that can record three level signals.

13. A controller according to claim 11, wherein
the medium is a communication path, and
the controller is a communication device.

14. A recording and reproducing method in a storage device including a storage medium, the method comprising:
converting user data of n bits into m three-ary symbols, where n is an integer equal to or larger than 3 and m is an integer equal to or larger than 2;
recording the symbols as a signal of any one of three levels corresponding to values of the symbols in a recording medium that can record three level signals; and
performing equalization of the m symbols simultaneously based on a signal read from the recording medium while setting the number of states as a power of 3 and using a trellis diagram having $2^n$ branches respectively corresponding to n bit data values from the respective states, and calculating $2^n$ likelihoods corresponding to n bit data values.

\* \* \* \* \*